United States Patent [19]
Rotier et al.

[11] Patent Number: 5,586,270
[45] Date of Patent: Dec. 17, 1996

[54] METHOD AND APPARATUS FOR UPGRADING A CENTRAL PROCESSING UNIT AND EXISTING MEMORY STRUCTURE IN A COMPUTER SYSTEM

[75] Inventors: Michael J. Rotier, Sunnyvale; William A. Huffman, Santa Cruz, both of Calif.

[73] Assignee: Intel Corporation, Santa Clara, Calif.

[21] Appl. No.: 129,686

[22] Filed: Sep. 30, 1993

[51] Int. Cl.$^6$ .............................. G06F 12/08; G06F 13/00
[52] U.S. Cl. .......................... 395/282; 395/833; 395/457
[58] Field of Search ..................................... 395/325, 282, 395/283, 833, 467, 457

[56] References Cited

U.S. PATENT DOCUMENTS

| | | | |
|---|---|---|---|
| 4,716,526 | 12/1987 | Mori et al. . | |
| 4,872,091 | 10/1989 | Maniwa et al. | 361/424 |
| 4,909,742 | 3/1990 | Ohkudo et al. | 439/59 |
| 5,073,851 | 12/1991 | Masterson et al. . | |
| 5,278,457 | 1/1994 | Fujita et al. | 307/269 |
| 5,287,292 | 2/1994 | Kenny et al. | 364/550 |
| 5,297,272 | 3/1994 | Lu et al. | 395/500 |
| 5,321,827 | 6/1994 | Lu et al. | 395/500 |
| 5,359,222 | 10/1994 | Okutomo et al. | 257/659 |
| 5,369,056 | 11/1994 | Burns et al. | 437/209 |
| 5,369,753 | 11/1994 | Tipley | 395/425 |
| 5,428,716 | 6/1995 | Herlihy et al. . | |

FOREIGN PATENT DOCUMENTS

| | | |
|---|---|---|
| 0411806 | 7/1990 | European Pat. Off. . |
| 0510241 | 6/1991 | European Pat. Off. . |

*Primary Examiner*—Jack B. Harvey
*Assistant Examiner*—Paul R. Myers
*Attorney, Agent, or Firm*—Blakely, Sokoloff, Taylor & Zafman

[57] ABSTRACT

The computer system having a first circuit board with a processor for processing information and a slot for receiving an IC card. The slot includes multiple pins for connection to the IC card. The IC card includes a second processor coupled to a second circuit board, where the processor is contained within outer framing structure. An interface coupled to the circuit board may be coupled to the multiple pins in the slot, such that the second processor in the integrated circuit card is able to control the computer system.

17 Claims, 6 Drawing Sheets

FIG_1

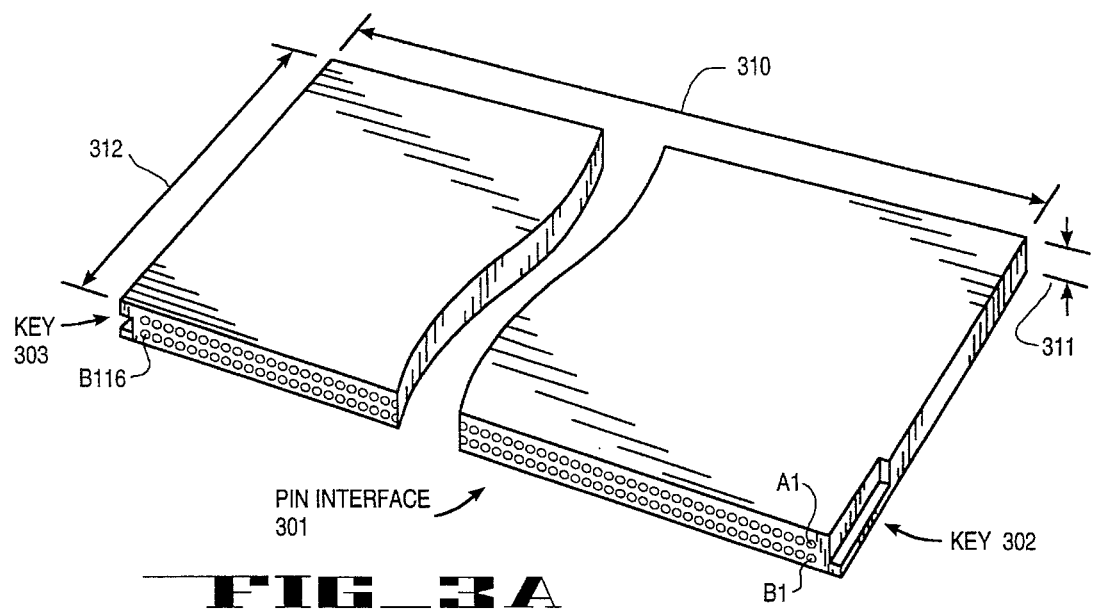
FIG_3A
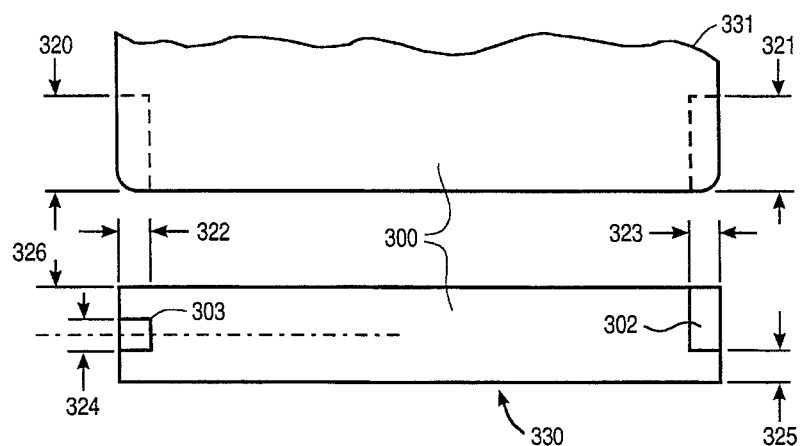
FIG_3B
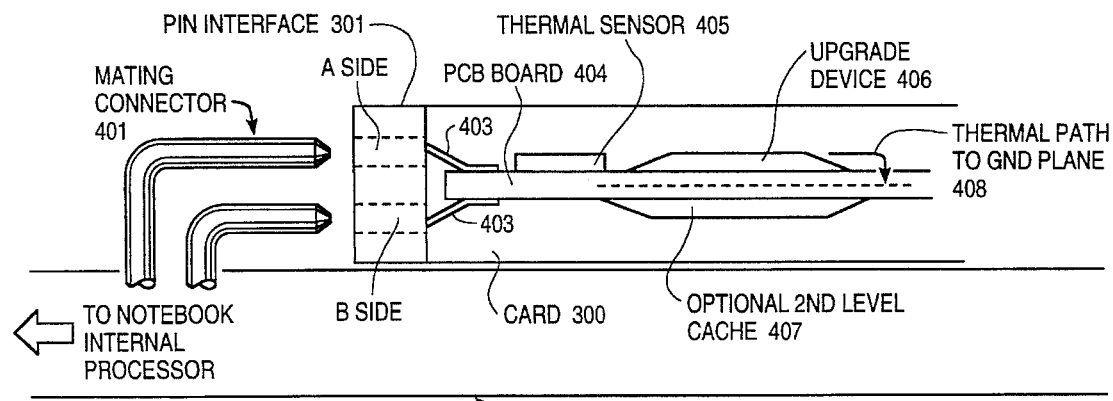
FIG_4

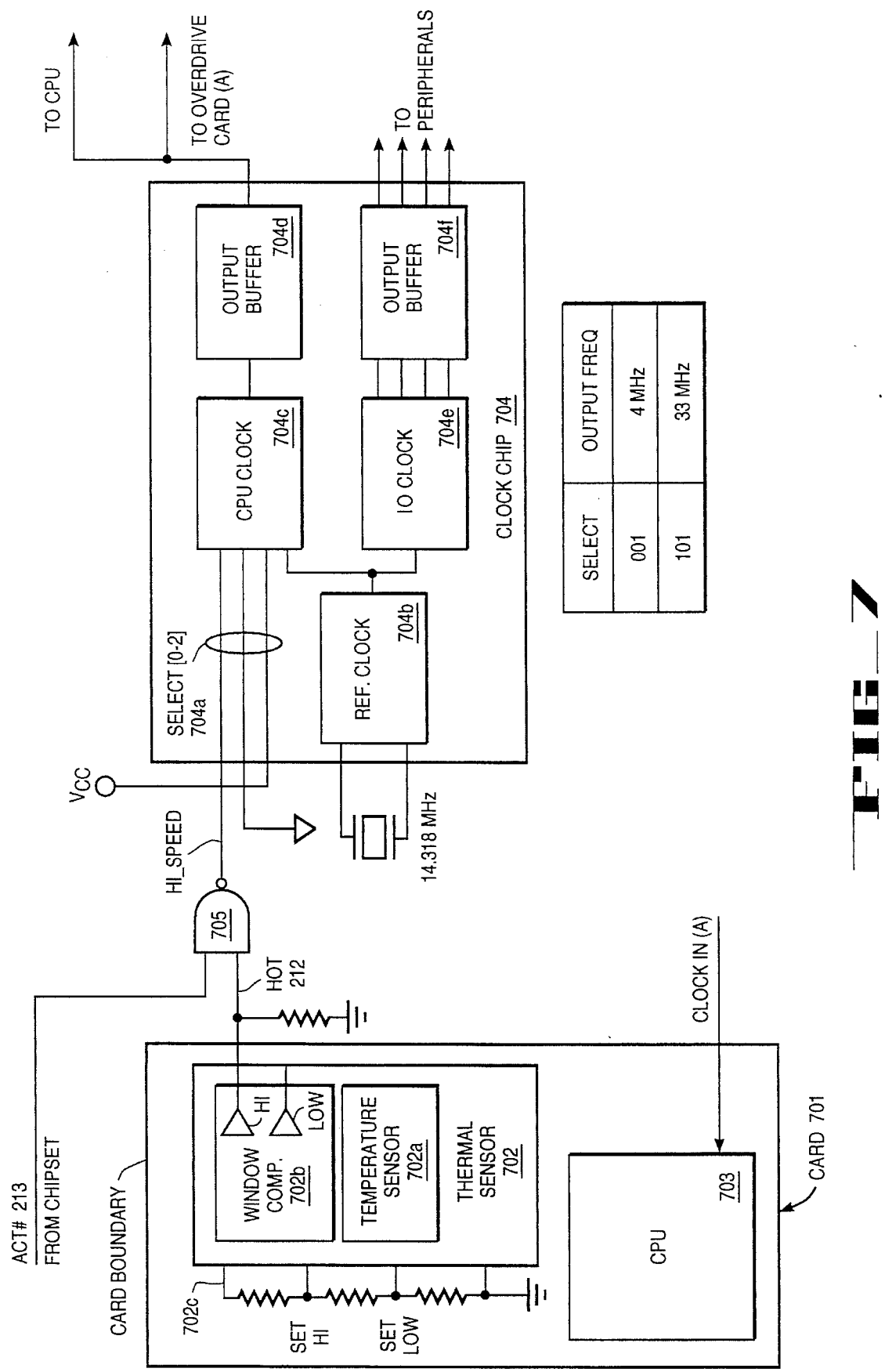
FIG_7

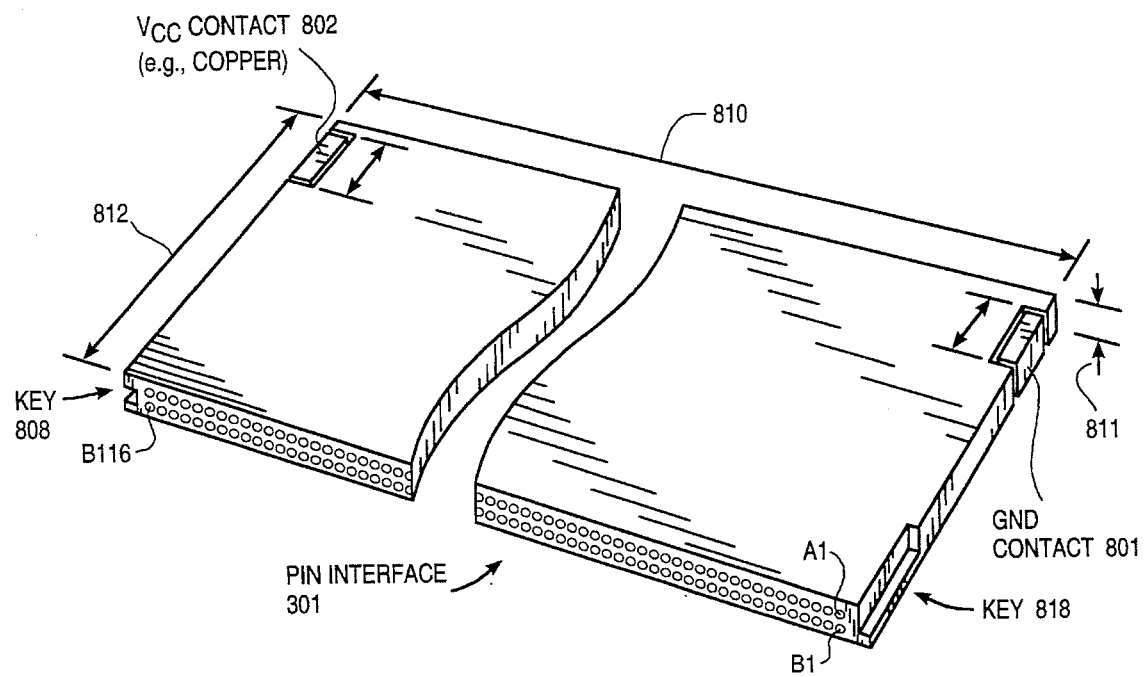
FIG_8A
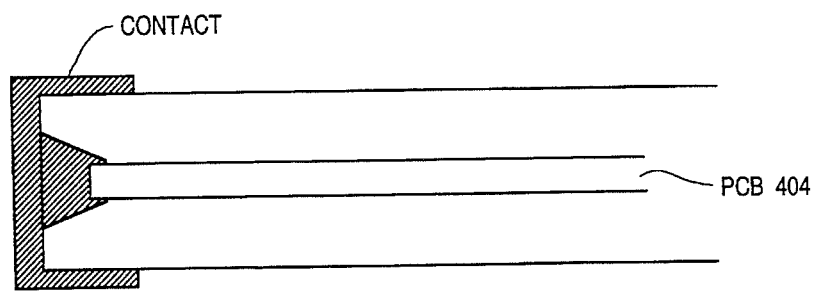
FIG_8B

METHOD AND APPARATUS FOR UPGRADING A CENTRAL PROCESSING UNIT AND EXISTING MEMORY STRUCTURE IN A COMPUTER SYSTEM

FIELD OF THE INVENTION

The present invention relates to the field of integrated circuit cards; particularly, the present invention relates to a method and apparatus for upgrading a central processing unit and the existing memory structure in a computer system using a credit-card sized integrated circuit card.

BACKGROUND OF THE INVENTION

One of the most rapidly growing markets for computer systems is the portable computer market. Recently, portable computers have become more powerful, while also becoming smaller and lighter. Furthermore, as a part of this changing market, the various computer components have become smaller and lighter while their ability to handle more data has increased.

Recently, devices have been designed that allow some of these various forms of computer components to be plugged into the same socket of a computer system, thereby reducing the space required within a portable computer. For example, an international standard which defines the physical and electrical interface specifications for the interchangeability of memory and input/output cards was introduced by Personal Computer Memory Card International Association (PCMCIA) jointly with the Japanese Electrical Industry Association (JEIDA) in September of 1991. In addition, a specification referred to as an Exchangeable Card Architecture (ExCA) specification, Dec. 20, 1991, has been issued by Intel Corporation of Santa Clara, Calif. The ExCA document describes specifications that manufacturers may use to provide interfaces which are ensured of allowing the memory and input/output cards for portable personal computers of different manufacturers to be interchanged.

A socket designed to these specifications allows cards, such as modem and flash memories to be attached, used, and removed interchangeability in the same socket. Computer systems typically include at least one socket recessed within the computer, such that the inserted components (e.g., modem, LAN, etc.) are protected by the body of the computer.

As devices and peripherals improve and advance, users often wish to upgrade their computer systems. In the prior art, to change components in a computer, the computer system had to be opened. Opening the computer system and exchanging the components is not an irregular occurrence with a personal computer. Specifically, designed circuit boards and cards are often inserted into personal computers. However, notebook or laptop computers are not regularly opened to upgrade or change the components inside. This is due to the components being designed specifically for the small dimensions of the computer casing. Anytime a computer system is opened, damage to electronic components and systems within the system may result, particularly in the case of notebook or lap-top type computers. It is desirable to be able to upgrade computer system components without having to open up the computer system.

One component which users often wish to upgrade is the microprocessor. Microprocessors in computer systems have undergone considerable advancement, usually to include additional features. The newer microprocessors often operate faster than their predecessors and also have more capabilities and functionality. When additional features are integrated in a microprocessor, its use must often require changes to the computer system to accommodate the new features. These changes could take the form of modifications to the circuit board, including the addition of new circuitry. Changes which require modifications to the bus architecture, including the bus width, are generally expensive. Ideally, new features and faster processing should be added without changing, for example, the mother board of a computer system. It is thus advantageous to upgrade a computer system to add a microprocessor that incorporates new features in such a way as to reduce or dispense with changes to the remainder of the computer system.

In the prior art, a computer system designed for a particular type of microprocessor could be upgraded with a different type of microprocessor using interface circuitry in the computer system. This interface circuitry is responsible for converting the signals to and from the newer microprocessor to a form that the computer system is designed to handle. This requires that the interface circuitry already exist in the computer system. One problem with such a solution is that the bus cycles used into the newer microprocessor are changed to those of the other processor, such that any benefits from using the newer bus cycles are negated. Also the interface circuitry can only handle a limited number (e.g., one) of upgraded processors. That is, the interface circuitry can only translate the signals of one particular upgraded microprocessor. Therefore, it is desirable to be able to upgrade components in a computer system without having to provide interface circuitry for upgrade components.

Another computer system upgrade that requires changes to the circuit board is a memory system upgrade. A memory system upgrade may constitute changing the memory components, such as changing to higher capacity components or adding one or more levels of additional memory. More and more computer systems have use for a second level cache memory. However, the addition of a second level cache to an existing computer system would require modifications to the computer system itself. It is advantageous to upgrade a computer system to include an additional cache memory without changing the computer system.

The present invention provides a mechanism for upgrading a computer system using a credit-card sized integrated circuit (IC) card. The IC card of the present invention may contain an upgraded version of the microprocessor in the computer system. Upon entry of the IC card into a slot in the side of the computer system, the on-board microprocessor is disabled and the microprocessor on the IC card acts as the microprocessor for the system without requiring special interface circuitry other than a pin-connector interface between the IC card and the computer system. The present invention also provides the ability to upgrade the memory structure of a computer system by adding a second level cache to a system that does not include one.

SUMMARY OF THE INVENTION

A computer system is described. The computer system of the present invention includes a first circuit board having a first processor. The computer system also includes a slot for receiving an integrated circuit (IC) card. The slot includes multiple mating connectors, or pins. The mating connectors are electrically coupled to the circuit board. The computer system also includes an integrated circuit (IC) card having a outer frame, a circuit board, a processor and an interface for sending signals between the first circuit board and the circuit board within the IC card. The second circuit board and the second processor are contained within the outer frame. In the computer system, the second processor controls the computer system and the first processor is disabled when the integrated circuit card is inserted in the slot. That is, when the plurality of mating connectors are coupled to the interface of the IC card, the signals from the second processor control and are compatible for use in the computer system.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 3A illustrates one embodiment of the integrated circuit (IC) card of the present invention.

FIG. 3B illustrates one side view and a partial top view of one embodiment of the IC card of the present invention.

FIG. 4 illustrates a section side view of one embodiment of the IC card of the present invention.

FIG. 7 is a block diagram depicting the clock control of the present invention.

FIGS. 8A and 8B illustrate another embodiment of the structure of the IC upgrade card of the present invention.

DETAILED DESCRIPTION OF THE PRESENT INVENTION

In the following detailed description of the present invention numerous specific details are set forth, such as specific number of pins, signal names, etc., in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring the present invention.

The present invention is advantageously employed in computer system design optimized for applications with lower power consumption and compact size. Such applications typically include small battery-powered personal computers of the type commonly referred to as laptops and notebooks. One embodiment of such computer system is briefly described below; however, it is to be understood that the present invention is not limited to this particular computer system design and may be incorporated into virtually any processor-based system design.

Figure 1:
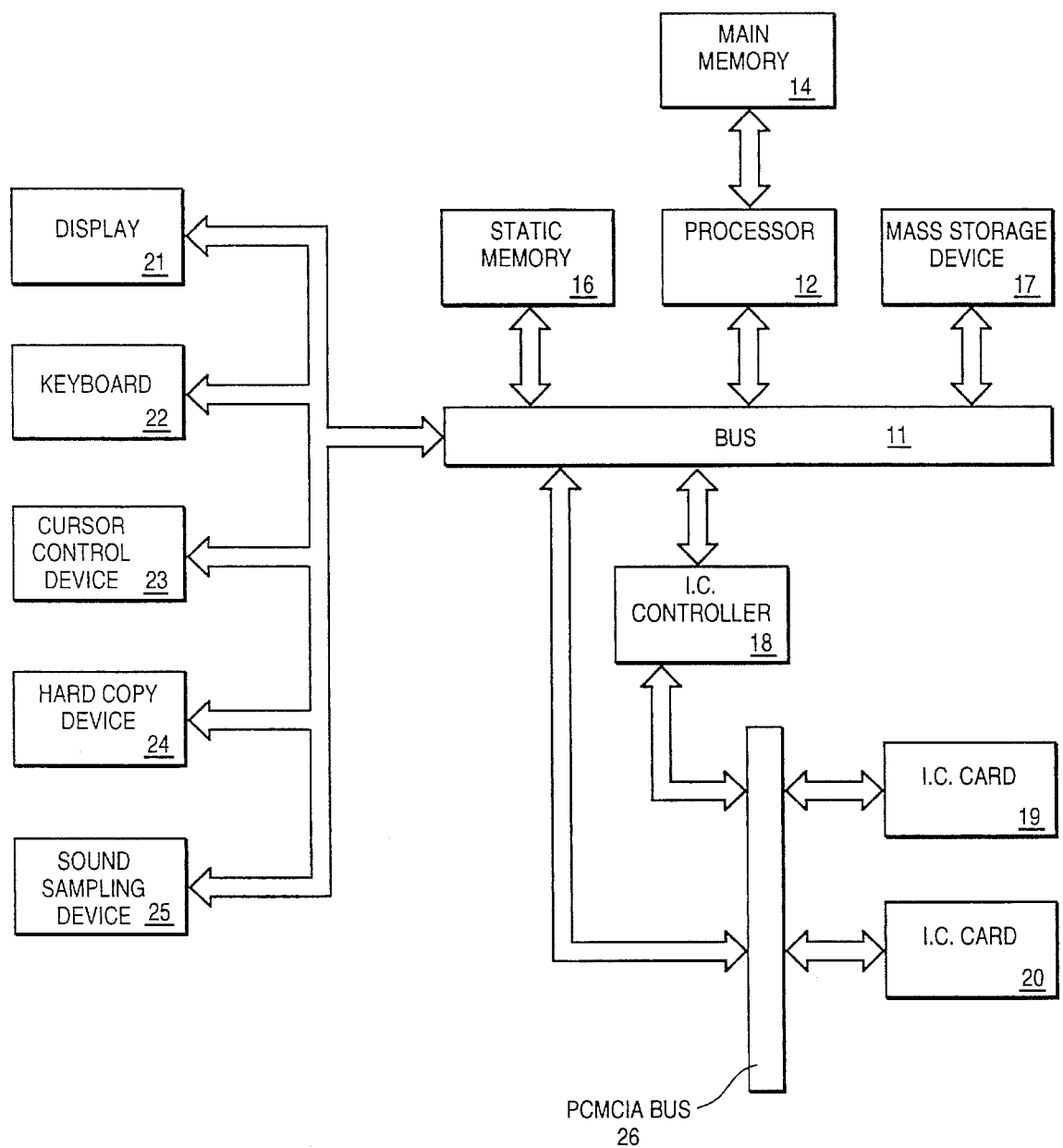
FIG. 1 is a block diagram of one embodiment of the computer system of the present invention.

Referring to FIG. 1, one embodiment of the computer system of the present invention is shown. In one embodiment, the computer system includes a Intel Architecture Microprocessor manufactured by Intel Corporation of Santa Clara, Calif., the assignee of the present invention. Such a computer system is compatible with the IBM™ PC AT Personal Computer. It will be understood while FIG. 1 is used for providing an overall description of the computer system of the present invention, a number of the details of the system are not shown. As necessary for disclosure of the present invention, further details set forth with reference to the other figures provided with this specification.

The computer system as may be utilized by the preferred embodiment of the present invention generally comprises a bus or communication means 11 for communicating information, processing means 12 coupled with bus 11 for processing information, a main memory, random access memory (RAM) or other dynamic storage device 14 coupled with processing means 12 for storing information and instructions for processing means 12, a static memory, read-only memory (ROM) or other non-volatile storage device 16 coupled with bus 11 for storing non-volatile information and instructions for processing means 12, a mass storage or data storage device 17, such as a magnetic disk or disk drive, coupled with bus 11 for storing information and instructions, a display device 21, such as a cathode ray tube, liquid crystal display, etc., coupled to bus 11 for displaying information to the computer user, a keyboard or alpha-numeric input device 22 including alpha-numeric and other keys, etc., coupled to bus 11 for communicating information and command selections to processor 12, and a cursor control 23 coupled to bus 11 for controlling cursor movement. The computer system also includes a hard copy device 24, such as a plotter or printer, for providing visual representation of the computer images. Hard copy device 24 is coupled with processor 12, main memory 14, static memory 16 and mass storage device 17 through bus 11. The computer system also includes a sound sampling device or sound recording and playback device 25 coupled to bus 11 for providing audio recording and playback.

Integrated circuit cards 19 and 20 are included in the computer system and are coupled to PCMCIA IC card bus 26. Note that although the computer system only shows two IC cards, the number of IC cards which may be coupled to the computer system may vary. In some embodiments, one or more IC cards may be included in the computer system. In one embodiment, IC cards 19 and 20 are PCMCIA cards. IC card bus 26 is coupled to bus 11 and to integrated circuit (IC) controller 18 for providing communication information between cards 19 and 20 and the remainder of the computer system. In one embodiment, IC cards 19 and 20 interface with the computer system through a pin-receptive connector at the end of each card. The interface may be a standard interface, such as a PCMCIA 68-pin standard interface, or a non-standard interface of any number of pin receptors or pins. IC controller 18 provides control and address information to IC cards 19 and 20 via IC card bus 26 and is coupled to bus 11. Although the cards are shown coupled to IC card bus 26, the cards are not coupled to IC card bus 26 until they are inserted into slots in the side of the computer, such that their standard interface is mated with the interface pins within the computer system.

Of course certain implementations and uses of the present invention may not require or include all of the above components. For example in certain implementations a keyboard and cursor control device for inputting information to the system may not be required. In other implementations, it may not be required to provide a display device for displaying information. Also, some components may be coupled in other configurations. For instance, main memory 14 may be coupled directly to bus 11 instead of being coupled to processor 12 directly.

Figure 2:
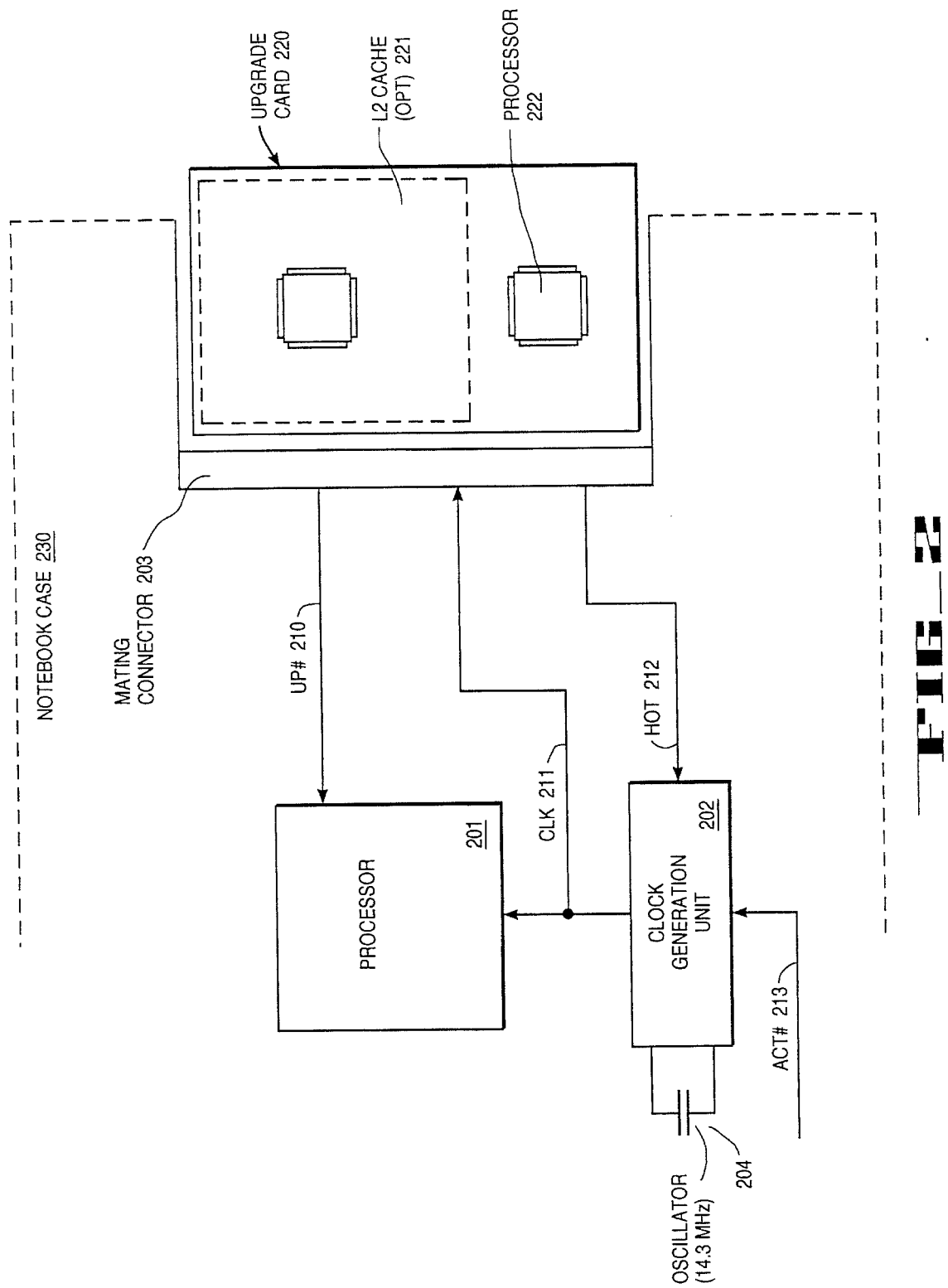
FIG. 2 is a block diagram depicting a portion of the computer system.

FIG. 2 illustrates a partial block diagram of one embodiment of the computer system of the present invention. The components of the computer system are shown within the case 230 of a notebook computer. To reiterate, the present invention is applicable to any computer system that is capable of interfacing with the IC cards of the present invention.

Referring to FIG. 2, processor 201 is shown coupled to receive a clock signal 211 from clock generation unit 202 and an UP# signal 210 from mating connector 203. In the following discussion, the "#" symbol following the name of a signal (e.g., UP#) indicates that the signal is active low. Mating connector 203 is also coupled to receive clock signal 211 from clock generation unit 202 to transfer the clock signal to the IC card of the present invention. Clock generation unit 202 is coupled to receive a HOT signal 212 via mating connector 203. Clock generation unit 202 is also coupled to receive an ACT# signal 213. An oscillator 204 is also shown coupled to clock generation unit 202. Also shown inserted in the side of the notebook case 230 is an integrated circuit (IC) card 220.

Processor 201 executes instructions in the computer system. Processor 201 executes instructions to control the computer system in a manner well-known in the art. Processor 201 may comprise a single integrated circuit fabricated using metal-oxide semiconductor (MOS) technology. In one embodiment, processor 201 is an Intel Architecture Microprocessor, manufactured by Intel Corporation of Santa Clara, Calif.

Processor 201 processes information in response to clock signal 211 from clock generation unit 202. Clock generation unit 202 generates clock signal 211 in response to clock pulses produces by oscillator 204. The generation of a clock signal from an oscillator derived clock pulse is well-known in the art. In one embodiment, oscillator 204 generates clock pulses at a frequency of 14.318 MHz.

IC card 220 includes processor 222 and may include a cache memory, such as second level (L2) cache memory 221, for use by processor 222. In one embodiment, processor 222 is a single integrated circuit (IC) fabricated using MOS technology. Processor 222 may comprise an Intel Architecture Microprocessor manufactured by Intel Corporation of Santa Clara, Calif.

Cache memory 221 is an L2 cache memory. In computer systems in which data memory is frequently used and updated, the ability to move said data at a high transfer rate becomes a gating item to the overall performance of the system. To increase this transfer rate, microprocessors like the Intel Architecture Microprocessor use a small but fast internal memory cache so frequently accessed data is read or updated local to the microprocessor instead of main memory. This is called a "Level 1" or "L1" cache. As increasing the size of this internal memory quickly increases the acceptable die size beyond manufacturable levels, the use of an external "Level 2" or "L2" cache is frequently used to balance overall system performance. Cache memory 221 may also include one or more integrated circuits. In one embodiment, cache memory 221 is a single IC fabricated using MOS technology and is designed to store 256K bytes of information. The use of cache memories, such as an L2 cache memory, is well-known in the art.

The present invention provides a mechanism to disable processor 201 when IC card 220 is inserted in the slot in the side of the computer system. In one embodiment, this mechanism includes UP# signal 210. The UP# signal 210 is not used until IC card 220 is inserted into the slot and coupled to mating connector 203. When IC card 220 is coupled to mating connector 203, the pins in mating connector 203 are inserted into the pin receptors on IC card 220. This causes UP# signal 210 to be asserted from IC card 220 to processor 201. The UP# signal 210 is received by processor 201 on a pin specifically designed to disable processor 201. When the UP#signal 210 is asserted, the processor 201 is disabled and processor 222 on IC card 220 is enabled. In one embodiment, when the UP# signal 210 is asserted, processor 201 tristates three states all of its output pins and enters power-down mode.

Once processor 222 has been enabled, it may operate with the remainder of the computer system in the same way processor 201 did. That is, processor 222 is able to run bus cycles on the system bus and operate with other components in the computer system. It should be noted that the signals generated by and received by IC card 220 do not have to be converted or translated in any way. The only interfacing required between the computer system and IC card 220 is the pin interface between the two.

The present invention provides a mechanism to prevent IC card 220 from becoming damaged due to the generation of excessive heat within card 220. In this manner, the circuit components in IC card 220 will be protected. In one embodiment, this mechanism causes clock signal 211 to be slowed when the temperature on-board IC card 220 is detected as being at some predetermined temperature level. The present invention uses HOT signal 212 to indicate to clock generation unit 202 that clock signal 211 is to be slowed. The HOT signal 212 is normally de-asserted. When the IC card 220 is inserted into mating connector 203, HOT signal 212 may be asserted. The HOT signal 212 is asserted when IC card 220 determines that it is becoming too hot. That is, when the temperature on IC card 220 exceeds a predefined temperature limit, IC card 220 causes HOT signal 212 to be asserted. When the HOT signal 212 is asserted, the clock signal 211 produced by clock generation unit 202 slows in frequency. The clock signal 211 is slowed to slow the operation of IC card 220, thereby reducing the heat produced on IC card 220.

One embodiment of the outer structure of the IC card of the present invention is shown in FIGS. 3A and 3B. Referring to FIG. 3A, card 300 is shown having a pin interface 301. Pin interface 301 includes 160 pin receptors divided into rows A and B, each having 80 pin receptors. The present invention is not limited to having 160 pin receptors. The actual number of pins supported by pin interface 301 is dependent on the signals required to operate the remainder of the computer system. In one embodiment, pin interface 301 includes 232 pin receptors. In fact, pin interface may include only pins or a combination of pins and pin-receptors. In the currently preferred embodiment, pin interface 301 is an interface for a 32-bit host bus designed to operate with an Intel Architecture Microprocessor, such as the 80486 brand microprocessor manufactured by Intel Corporation of Santa Clara, Calif. In one embodiment, card 300 is a credit-card signal IC card with a height 311 of 3 mm, a length 310 (along the side having pin interface 301 and its opposite side) of 86 mm, and a width 312 of 54 mm. In another embodiment, length 310 may be 106 mm.

Note that both sides of card 300 may include keys for insertion into the slot. In one embodiment, keys 302 and 303 are provided to insure that card 300 is properly inserted into the mating slot of the computer system. In other words, if an attempt is made to insert card 300 in the side of the computer system up-side down, then keys 302 and 303 prevent the mating connector 203 from being able to accept the connector interface 301 of card 300.

FIG. 3B illustrates a partial top view 331 and a side view 330 of one embodiment of an IC card having keys 302 and 303. As shown in the partial top view 331, key 303 extends a length 320 down the side of card 300, while key 302 extends a length 321 down the side of card 300. In one embodiment, length 320 and length 321 are both 11.5 mm. Key 303 extends a distance 322 in from the side of card 300. In one embodiment, dimension 322 comprises 1 mm. The center of key 303 is a distance 326 from the top of card 300. Key 303 opening extends a width 324 along the side of card 300. In one embodiment, distance 326 is 1.65 mm and distance 324 is 1.60 mm. Key 302 extends a distance 323 in from the other side of card 300. Key 302 also begins a distance 325 up from the bottom of card 300. In one embodiment, distance 323 and distance 325 are both 1 mm.

FIG. 4 illustrates a section view of the side of card 300. Card 300 is shown having pin interface 301, wire bond leads 403, PCB Board 404, thermal sensor 405, upgrade or overdrive device 406, second level cache memory 407 (optional) and thermal path 408. Pin interface 301 is coupled to leads 403. Leads 403 are coupled to PCB Board 404. Also coupled to PCB Board 404 is upgrade device 406, cache memory 407, and thermal sensor 405. Thermal path 408 is coupled between overdrive device 406 and the ground plane of PCB Board 404. Pin interface 301 receives mating connectors 401 from the host computer system. Mating connectors 401 are coupled to the printed circuit board (PCB) 402 of the computer system. Although only two are shown, in actuality, there are two rows of multiple mating converters. As shown, pin interface 301 has two sides of pin receptors, side A and side B, each of which has multiple receptors. Each of the pin holes is coupled to a separate wirebond, such as leads 403, for electrically coupling mating connectors 401 (i.e., pins) to PCB board 404 of card 300. It is through pin interface 301 and leads 403 that signals are transferred between the notebook or computer system PCB board 402 and PCB board 404.

In the present invention, PCB board 404 is also shown coupled to an upgrade device 406. Upgrade device 406 may be a microprocessor, such as an Intel Architecture Microprocessor manufactured by Intel Corporation of Santa Clara, Calif. Upgrade device 406 may be a microcontroller or other similar type device capable of controlling the computer system in some predefined manner when IC card 300 is inserted into the slot in the side of the computer system. In one embodiment, upgrade device 406 is a device having increased or better performance characteristics than processor 201. Upgrade device 406 is limited to a device that is capable of being integrated into card 300 while remaining within the height 311 of card 300. Therefore, upgrade device 406 must be an integrated circuit which is manufactured, such that its component height is low. In the present invention, upgrade device 406 is a tape carrier package (TCP) or a package made using tape automated bonding (TAB).

Figure 5:
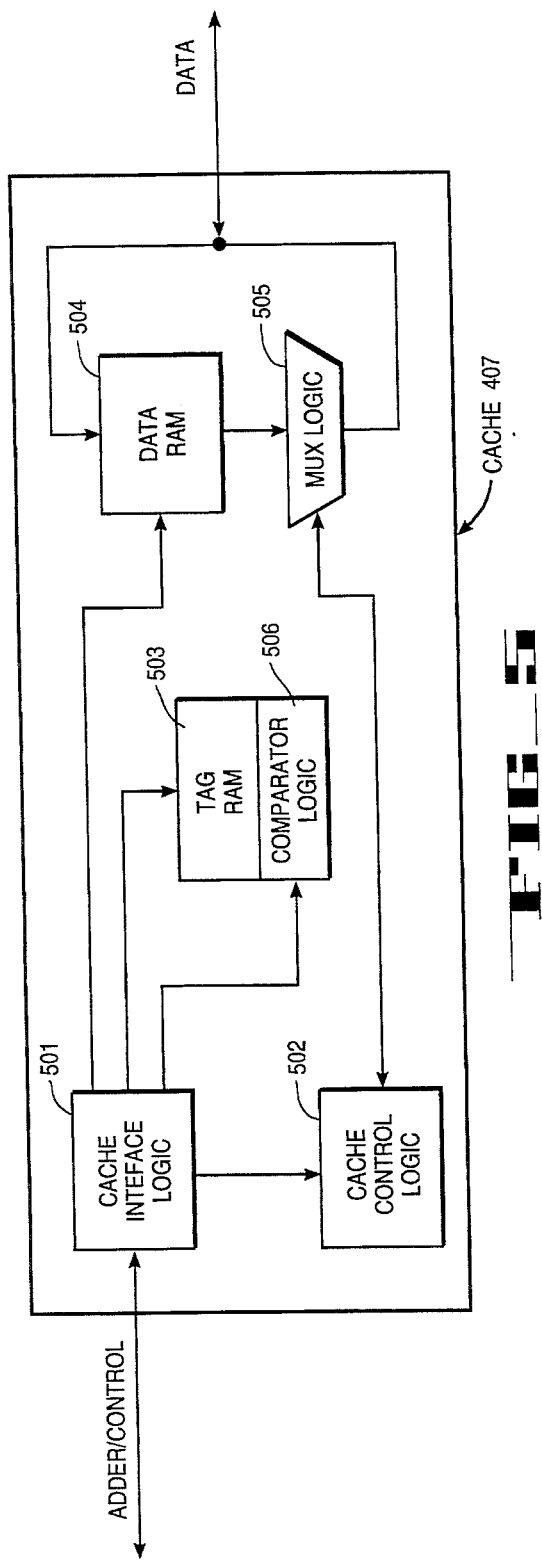
FIG. 5 is a block diagram of one embodiment of the Level two cache of the present invention.

Card 300 may also include a second level cache, such as cache memory 407. FIG. 5 is a block diagram of one embodiment of cache memory 407. Referring to FIG. 5, cache memory 407 includes interface logic 501, control logic 502, tag random access memory (RAM) 503, comparator 506, data RAM 504 and multiplexer (MUX) 505. These components operate and are coupled in a manner well-known in the art. Interface logic 501 is coupled to receive control signals and addresses from off-chip and control signals from control logic 502 in order to provide access to cache memory 407 by the remainder of the computer system, including upgrade device 406. Interface logic 501 is also coupled to tag RAM 503, comparator 506 and data RAM 504. Comparator 506 is also coupled to control logic 502. Data RAM 504 is also coupled to the data path for data being transferred to and from cache memory 407.

Data RAM 504 includes multiple memory banks for storing code and data. Tag RAM 503 stores main system memory addresses of code and data stored in data RAM 504. Interface logic 501 receives memory requests from upgrade device 406 and, in conjunction with control logic 502, causes the address of the memory request to be compared to the stored addresses in tag RAM 503 using comparator 506. When the memory request address matches an address stored in tag RAM 503, control logic 502 causes the information to be returned from data RAM 504 through MUX 505 over the data path. If the memory request address does not match any entry in tag RAM 503, the memory request is passed onto the main system memory. When the information requested is returned from the main system memory to the upgrade device 406 (e.g., the processor), a copy is stored in data RAM 504 in cache memory 407 for future use. The operation of cache memory 407 is well-known in the art.

In one embodiment, cache memory 407 is a 256K byte 2-way set-associative cache memory system having a line size of 16 bytes. Each way contains 4k tags, where each of the tags controls two lines of the cache memory. The upper address bits A31–A17 are stored in tag RAM 503 when data is written into cache memory 407. The lower address bits A16–A5 are used to select one of the 4k tags. Address bits A4–A2 select the line and the doubleword within the cache line. For a two-way set-associative cache, data may be stored in two locations for each data line. During read operations, the address bits A 16–A5 access the two tags from tag RAM 503 simultaneously and the two tags are compared by comparator 506. The matched tag indicates the desired data is stored in data RAM 504, thereby generating a cache hit. Once a cache hit occurs, any of the bytes in the cache line may be read from cache 407. If a match does not occur between the tags and the address bits, then a cache miss is generated and the data is read from system memory.

Cache memory 407 may be a write through cache memory. By being a write through cache memory, cache memory 407 does not require a large number of extra pins in the interface of IC card 300 to support its use. All memory requests that do not hit cache memory 407 are sent out using signals from upgrade device 406 (i.e., the processor) to the main system memory. Since cache memory 407 does not require a large number of extra signals to be added, the present invention allows a computer system to be upgraded to include an L2 cache where one was not previously present in the system. Thus, L2 cache 407 may be included for use with computer systems that do not contain a second level cache.

In one embodiment, cache memory 407 is a single IC chip cache memory that is functionally identical to the 82485 brand cache controller manufactured by Intel Corporation of Santa Clara, Calif. used in conjunction with an integrated 256 k cache memory. In another embodiment, cache memory 407 is the CXK784862 brand cache memory manufactured by Sony Microelectronics Corporation of San Jose, Calif. The Sony CXK784862 cache memory supports a second level cache within the physical confines of the present invention when its package as a TQFP or TCP package.

Figure 6:
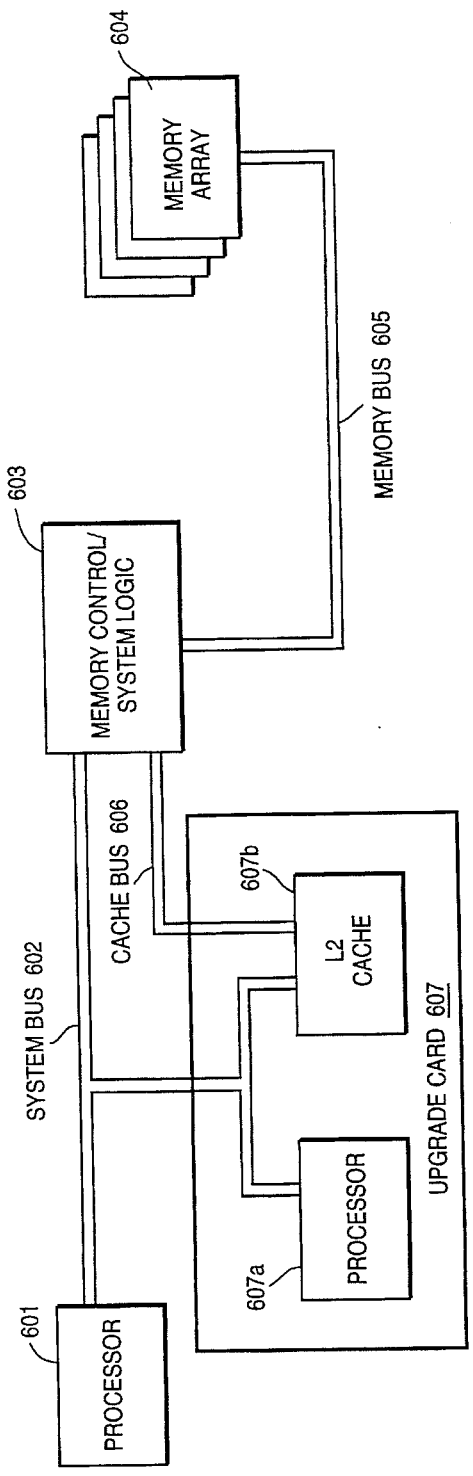
FIG. 6 is a block diagram of one embodiment of the memory subsystem of the computer system of the present invention.

Cache memory 407 is coupled to PCB board 404 such that upgrade device 406 is able to access data and instructions that are stored within cache memory 407 as well as access information from the main memory of the computer system. FIG. 6 illustrates one embodiment of the memory system of the computer system of the present invention. Referring to FIG. 6, processor 601 is the on-board processor of the computer system. Processor 601 is coupled to the memory control/system logic 603 of the computer system through system bus 602. Memory control/system logic 603 provides access to the memory array 604, representing the main memory, via memory bus 605. The IC card of the present invention, referred to as upgrade card 607, is shown integrated into the computer system. Processor 607A on upgrade card 607 is interfaced to memory control/system logic 603 via system bus 602. Upgrade card 607 includes cache memory 607B that is interfaced to memory control/system logic 603 via a separate cache bus 606.

In one embodiment, processor 607A, cache memory 607B and memory control/system logic 603 uses data signals, such as DATA31-0 and DP3-0 signals, to transfer data between each other. Address signals are also transferred between processor 607A and memory control/system logic 603, as well as being received by cache memory 607B. Processor 607A also interfaces to cache memory 607B by asserting/de-asserting the BE3# BE0#, ADS#, M/IO#, W/R# and BLAST# signals. Cache memory 607B interfaces with memory control/system logic 603 by asserting/de-asserting the L2START#, L2BRDY0# and L2CKEN# signals. Memory control/system logic 603 interfaces with processor 607A and cache memory 607B by asserting/de-asserting the EADS#, BOFF#, CLK, RESET, and FLUSH# signals. Memory control/system logic 603 also interfaces with processor 607A by asserting the KEN#, BRDY# and RDY# signals. Memory control/system logic 603 also interfaces with cache memory 607B by asserting/de-asserting the L2WP, L2START#, L2SKEN#, L2PRSN#, L2ENABLE#, L2CRDY#, L2CKEN#, L2CBRDY#, and the L2BRDY0#signals. All of these signals are described below.

Referring back to FIG. 4, it should be noted that in one embodiment cache memory 407 is interfaced to upgrade device 406, such that a large number of signals corresponding to the cache memory 407 do not have to leave card 300 in order to make use of cache memory 407. In other words, cache memory 407 is designed, such that a small number of extra pins (or pin receptors) between card 300 and the computer system are required to support its use in the system. Cache memory 407 could be designed to use a portion of the interface 301 of card 300 to allow access between the computer system and cache memory 407 directly. Cache memory 407 is also limited to having components which are low in height. In one embodiment, cache memory 407 includes a cache controller integrated in a thin small outline package (TSOP) or TCP package.

As shown in FIG. 4, the present invention may include a thermal sensor 405 for maintaining upgrade device 406 (e.g., the processor) within a correct operating temperature range. FIG. 7 illustrates a block diagram of the clocking system of the computer system of the present invention. Referring to FIG. 7, IC card is shown having central processing unit (CPU) 703, thermal sensor 702 and resistor ladder 702C. Thermal sensor 702 is shown having window comparator 702B and temperature sensor 702A. The output of the high comparator of window comparator 702B is output from IC card 701 as the HOT signal 212 (FIG. 2). The HOT signal 212 is coupled to one input of NAND gate 705. The other input of NAND gate 705 is coupled to the ACT# signal (FIG. 2). The output of NAND gate 705 is one of the select[0–2] inputs to clock chip 704. One of the other select[0–2] inputs is coupled to ground, while the last of the three is coupled to Vcc. The select[0–2] inputs are received by the CPU clock generator 704C which generates the CPU clock signals using reference clock 704B. The CPU clock generated depends on the select[0–2] signals. If the bit pattern on the select[0–2] signals is 001, then the CPU clock generator 704C enters slow clock mode and outputs a CPU clock having a frequency of 4 Mhz. If the bit pattern on the select[0–2] signals is 001, then the CPU clock generator 704C enters fast clock mode and outputs a CPU clock having a frequency of 33 Mhz. In one embodiment, thermal sensor 702 comprises a TMP-01 Low Power, Programmable Temperature Controller brand thermal sensor manufactured by Analog Devices of Mountain View, Calif., and clock chip 704 is a AV9155 Low Cost Desktop Frequency Generator brand clock chip manufactured by Avasem Corporation of San Jose, Calif.

When the high temperature trip point is reached, which is determined by the resistor ladder 702C coupled to the inputs of thermal temperature sensor 702A, the output of the window comparator 702B asserts the HOT signal 212, thereby causing the clock circuit 704 to go into slow clock mode. In one embodiment, the output frequency of clock chip 704 to the CPU 201 and CPU 703 is approximately 4 Mhz. When the ambient temperature of IC card 701 returns to its normal range, window comparator 702B de-asserts the HOT signal 21 2, thereby causing the clock output of clock chip 704 to go to 33 Mhz.

The ACT# signal 213 is driven by the supporting chipset and is generated by monitoring system activity external to the chipset, such as keyboard strokes, mouse moves, modem, fax or network access. If none of these events are occurring, the chipset de-asserts the ACT# signal 213 which allows the clock circuit to again enter its slow clock mode. When an event is detected, it is imperative to speed the processor to full speed to process the event in a timely manner so the user perceives minimal latency; therefore, the ACT# signal 213 is re-asserted. Using this method, the possibility exists for the system to want full speed operation while the IC card 701 is still operating out of its safe temperature range. As this should only occur during an extended user-unattended I/O cycles as in receiving a large FAX, this may not be a problem as the processor should be able to respond to this sufficiently.

It should be noted that in the present invention the on-chip clock speed is limited to that required for use by the processor used in the computer system and is not a function of the external clock circuit used in this invention. In one embodiment, processor 201 (FIG. 2) comprises either a 80486–25 or –33 brand microprocessor manufactured by Intel Corporation of Santa Clara, Calif., both of which are less expensive and have lower performance than the 80486 D X2–50 or –66 brands of microprocessors manufactured by Intel Corporation. Upon upgrading a system which might initially be using a –25 or –33 component, the IC card would be compatible to the external bus speed.

The following is one embodiment of the pin definition of the IC card of the present invention. Table 1 illustrates the pins used by and for the processor, for controlling the clock and for the L2 cache memory of the IC card.

TABLE 1

Pin Definitions

| Processor Pins | | Clock Control | L2 Cache Option |
|---|---|---|---|
| A20M# | A31–A2 | HOT | L2BRDYO# |
| ADS# | AHOLD | | L2CBRDY# |
| BE0–3 | BLAST# | | L2CKEN# |
| BOFF# | BRDY# | | L2CRDY# |
| BREQ | BS16# | | L2ENABLE# |
| BS8# | *CACHE# | | L2PRSN# |
| CLK | D/C# | | L2SKEN# |
| D31–D0 | DP3–0 | | L2START# |
| EADS# | FERR# | | L2WP |
| FLUSH# | *HITM# | | |
| HLDA | HOLD | | |
| IGNNE# | *INC | | |
| INTR | *INV | | |
| KEN# | LOCK# | | |
| M/IO | NMI | | |
| PCD | PCHK# | | |
| PLOCK# | PWT | | |
| RDY# | RESET | | |
| SMI# | SMIACT# | | |
| SRESET | STPCLK# | | |
| TCK | TDI | | |
| TDO | TMS | | |
| UP# | W/R# | | |
| *WB/WT# | | | |

*Reserved for future use.

In one embodiment, the processor pins are defined to be identical to the identically named pins on the Intel80486 brand microprocessor manufactured by Intel Corporation of Santa Clara, Calif. These processor pins are direct non-buffered connections from the CPU 201 to the IC card 222 shown in FIG. 2. The IC card of the present invention also includes Vcc and Ground pins. In one embodiment, the IC card of the present invention includes 20 Vcc pins at 3.3 v (+0.3 v–0.2 v) and 21 ground pins have been added. In this case, the total pin count is 160 pins.

Another embodiment is described in FIGS. 8A and 8B. In one embodiment of the present invention, the leads 403 as shown in FIG. 4 connecting the pin interface 301 to the PCB board 404 are too small to carry the large amounts of current due to the size constraint placed on the outer structure of the card. However, large amounts of current may be required for other embodiments of the present invention. In the present invention, 20 Vcc pins and 21 Gnd pins have been added, such that the IC card is able to accommodate an upgrade device similar to the Intel486DX2 brand of microprocessor manufactured by Intel Corporation of Santa Clara, Calif., the corporate assignee of the present invention.

In FIGS. 8A and 8B, the additional Vcc and Gnd pins have been deallocated, thereby freeing these pins for use in a Pentium™ based upgrade card which requires more pins due to its 64 bit data path and more sophisticated I/O bus structure. To replace these Vcc and Gnd pins, two "U" shaped gold plated copper contacts 801 and 802 are added. Contacts 801 and 802 connect internally to the PCB, such as shown in FIG. 8B. In the embodiment shown in FIG. 8B, the contact extends beyond the top and bottom a distance of 1 mm in each direction. Upon insertion of the upgrade card 220 (FIG. 2) into the notebook case 230 (FIG. 2), spring loaded contacts would make contact and supply power. Note that the width of the contacts 801 and 802, and the width 812 of the cards is 54 mm, the length 810 of the card is 86 mm and the height 811 of the card is 3 mm.

A description of certain pins has been provided in Table 2 below. The following descriptions are similar to those listed in the data sheet for the Intel486DX2 brand of microprocessor, February 1992, and the SL enhanced Intel486SL brand microprocessor, Addendum 1993, both manufactured by Intel Corporation of Santa Clara, Calif., the corporate assignee of the present invention. Although descriptions are provided, these descriptions should be considered as exemplary and should not be taken to limit the present invention to only the specific implementation.

TABLE 2

| Symbol | Type | Name and Function |
|---|---|---|
| CLK | I | Clock provides the fundamental timing for the bus interface unit and is multiplied by two (2×) to provide the internal frequency for the upgrade card. All external timing parameters are specified with respect to the rising edge of CLK. |
| ADDRESS BUS | | |
| A31–A4<br>A2–A3 | I/O<br>O | A31–A2 are the address lines of the microprocessor. A31–A2, together with the byte enables BE0#–BE3#, define the physical area of memory or input/output space assessed. Address lines A31–A4 are used to drive addresses into the microprocessor to perform cache line invalidation's. Input signals must meet setup and hold times. A31–A2 are not driven during bus or address hold. |
| BE0–3# | I/O | The byte enable signals indicate active bytes during read and write cycles. During the first cycle of a cache fill, the external system should assume that all byte enables are active. BE3# applies to D24–D31, BE2# applies to D16–D23, BE1# applies to D8–D15 and BE0# applies to D0–D7. BE0# are active LOW and are not driven during bus hold. |
| DATA BUS | | |
| D31–D0 | I/O | These are the data lines for the upgrade card. Lines D0–D7 define the least significant byte of the data bus while lines D24–D31 define the most significant byte of the data bus. These signals must meet setup and hold times for proper operation on |

TABLE 2-continued

| Symbol | Type | Name and Function |
| --- | --- | --- |
| | | reads. These pins are driven during the second and subsequent clocks of write cycles. |
| DP0–DP3 | I/O | There is one data parity pin for each byte of the data bus. Data parity is generated on all write data cycles with the same timing as the data driven back into the microprocessor on the data parity pins with the same timing as read information to ensure that the correct parity check status is indicated by the upgrade card. The signals read on these pins do not affect program execution. Input signals must meet setup and hold times. DP0–DP3 should be connected to Vcc through a pullup resistor in systems which do not use parity. DP0–DP3 are active HIGH and are driven during the second and subsequent clocks of write cycles. |
| PCHK# | O | Parity status is driven on the PCHK# pin the clock after ready for read operations. The parity status is for data sampled at the end of the previous clock. a parity error is indicated by PCHK# being LOW. Parity status is only checked for enabled bytes as indicated by the byte enable and bus size signals. PCHK# is valid only in the clock immediately after read data is returned to the microprocessor. At all other times PCHK# is inactive (HIGH). PCHK# is never floated. |
| BUS CYCLE DEFINITION | | |
| M/IO# | O | The memory/input-output, data/control and |
| D/C# | O | write/control and write/read lines are the primary |
| W/R# | O | bus definition signals. These signals are driven valid as the ADS# signal is asserted. |

| M/IO# | D/C# | W/R# | Bus Cycle Initiated |
| --- | --- | --- | --- |
| 0 | 0 | 0 | Interrupt Acknowledge |
| 0 | 0 | 1 | Halt/Special Cycle |
| 0 | 1 | 0 | I/O Read |
| 0 | 1 | 1 | I/O Write |
| 1 | 0 | 0 | Code Read |
| 1 | 0 | 1 | Reserved |
| 1 | 1 | 0 | Memory Read |
| 1 | 1 | 1 | Memory Write |

| Symbol | Type | Name and Function |
| --- | --- | --- |
| | | The bus definition signals are not driven during bus hold and follow the timing of the address bus. |
| LOCK# | O | The bus lock pin indicates that the current bus cycle is locked. The upgrade card will not allow a bus hold when LOCK# is asserted (but address holds are allowed). LOCK# goes active in the first clock of the first locked bus cycle and goes inactive after the last clock of the last locked bus cycle. The last locked cycle ends when ready is returned. LOCK# is active LOW and is not driven during bus hold. Locked read cycles will not be transformed into cache fill cycles if KEN# is returned active. |
| PLOCK# | O | The pseudo-lock pin indicates that the current bus transaction requires more than one bus cycle to complete. Examples of such operations are floating point long reads and writes (64 bits), segment table descriptor reads (64 bits), in addition to cache line fills (1 28 bits). The upgrade card will drive PLOCK* active until the addresses for the last bus cycle of the transaction have been driven regardless of whether RDY# or BRDY# have been returned. Normally PLOCK# and BLAST# are inverse of each other. However, during the first bus cycle of a 64-bit floating point write, both PLOCK# and BLAST# will be asserted. PLOCK# is a function of the BS8*, BS16* and KEN# inputs. PLOCK# should be sampled only in the clock ready is returned. PLOCK# is active LOW and is not driven during bus hold. |
| BUS CONTROL | | |
| ADS# | O | The address status output indicates that a valid bus cycle definition and address are available on the cycle definition lines and address bus. ADS# is driven active in the same clock as the addresses |

TABLE 2-continued

| Symbol | Type | Name and Function |
|---|---|---|
| | | are driven. ADS# is active LOW and is not driven during bus hold. |
| RDY# | I | The non-burst ready input indicates that the current bus cycle is complete. RDY# indicates that the external system has presented valid data on the data pins in response to a read or that the external system has accepted data from the upgrade card in response to a write. RDY# is ignored when the bus is idle and at the end of the first clock of the bus cycle.<br>RDY# is active during address hold. Data can be returned to the processor while AHOLD is active. RDY# is active LOW, and is not provided with an internal pullup resistor. RDY# must satisfy setup and hold times. |
| BURST CONTROL | | |
| BRDY# | I | The burst ready input performs the same function during a burst cycle that RDY# performs during a non-burst cycle. BRDY# indicates that the external system has presented valid data in response to a read or that the external system has accepted data in response to a write. BRDY# is ignored when the bus is idle and at the end of the first clock in a bus cycle.<br>BRDY# is sampled in the second and subsequent clocks of a burst cycle. The data presented on the data bus will be strobed into the microprocessor when BRDY# is sampled active. If RDY# is returned simultaneously with BRDY#, BRDY# is ignored and the burst cycle is prematurely interrupted.<br>BRDY# is active LOW and is provided with a small pullup resistor. BRDY# must satisfy the setup and hold times. |
| BLAST# | O | The burst last signal indicates that the next time BRDY# is returned the burst bus cycle is complete. BLAST# is active for both burst and non-burst bus cycles. BLAST# is active LOW and is not driven during bus hold. |
| INTERRUPTS | | |
| RESET | I | The reset input forces the upgrade card to begin execution at a known state. The microprocessor cannot begin execution of instructions until at least 1 ms after Vcc and CLK have reached their proper DC and AC specifications. The RESET pin should remain active during this time to insure proper Microprocessor operation. RESET is active HIGH. RESET is asynchronous but must meet setup and hold times for recognition in any specific clock. |
| INTR | I | The maskable interrupt indicates that an external interrupt has been generated. If the internal interrupt flag is set in EFLAGS, active interrupt processing will be initiated. The upgrade card will generate two locked interrupt acknowledge bus cycles in response to the INTR pin going active. INTR must remain active until the interrupt acknowledges have been performed to assure that the interrupt is recognized. INTR is active HIGH and is not provided with an internal pulldown resistor. INTR is asynchronous, but must meet setup and hold times for recognition in any specific clock. |
| NMI | O | The non-maskable interrupt request signal indicates that an external non-maskable interrupt has been generated. NMI is rising edge sensitive. NMI must be held LOW for at least four CLK periods before this rising edge. NMI is not provided with an internal pulldown resistor. NMI is asynchronous, but must meet setup and hold times for recognition in any specific clock. |
| SRESET | I | The SRESET pin duplicates all the functionality of the RESET pin with the following two exceptions:<br>1. The SMBASE register will retain its previous value.<br>2. If UP# (I) is asserted, SRESET will not have an |

TABLE 2-continued

| Symbol | Type | Name and Function |
|---|---|---|
| | | effect on the host microprocessor (601). For soft resets, SRESET should remain active for at least 15 CLK periods. SRESET is active HIGH. SRESET is asynchronous but must meet setup and hold times for recognition in any specific clock. |
| SMI# | I | The System Management Interrupt input is used to invoke the System Management Mode (SMM). SMI# is a falling edge triggered signal which forces the upgrade card into SMM at the completion of the current instruction. SMI# is recognized on an instruction boundary and at each iteration for repeat string instructions. SMI# does not break LOCKed bus cycles and cannot interrupt a currently executing SMM. The upgrade card will latch the failing edge of one pending SMI# signal while the upgrade card is executing an existing SMI. The nested SMI will not be recognized until after the execution of a Resume (RSM) instruction. |
| SMIACT# | O | The System Management Interrupt Active is an active low output, indicating that the processor is operating in SMM. It is asserted when the upgrade card begins to execute the SMI state save sequence and will remain active LOW until the processor executes the last state restore cycle out of SMRAM. |
| STPCLK# | O | The StoP CLocK request input signal indicates a request has been made to turn off the CLK input. When the upgrade card recognizes a STPCLK#, the processor will stop execution on the next instruction boundary, unless superseded by a higher priority interrupt, empty all internal pipelines and the write buffers and generate a Stop Grant acknowledge bus cycle. STPCLK# is active LOW and is provided with an internal pull-up resistor. STPCLK# is asynchronous but setup and hold times must be met to ensure recognition in any specific clock. |
| BREQ | O | The internal cycle pending signal indicates that the upgrade card microprocessor has internally generated a bus request. BREQ is generated whether or not the upgrade card is driving the bus. BREQ is active HIGH and is never floated. |
| HOLD | I | The bus hold request allows another bus master complete control of the upgrade card will float most of its output and input/output pins. HLDA will be asserted after completing the current bus cycle, burst cycle or sequence of locked cycles. The upgrade card will remain in this state until HOLD is deasserted. HOLD is active high and is not provided with an internal pulldown resistor. HOLD must satisfy setup and hold times for proper operation. |
| HLDA | O | Hold acknowledge goes active in response to hold request presented on the HOLD pin. HLDA indicates that the upgrade card has given the bus to another local bus master. HLDA is driven active in the same clock that the upgrade card floats its bus. HLDA is driven inactive when leaving bus hold. HLDA is active HIGH and remains driven during bus hold. |
| BOFF# | I | The backoff input forces the upgrade card to float its bus in the next clock. The microprocessor will float all pins normally floated during bus hold but HLDA will not be asserted in response to BOFF#. BOFF# has higher priority than RDY# or BRDY#; if both are returned in the same clock, BOFF* takes effect. The microprocessor remains in bus hold until BOFF# is negated. If a bus cycle was in progress when BOFF# was asserted the cycle #All be restarted. BOFF# is active LOW and must meet setup and hold times for proper operation. |
| CACHE INVALIDATION | | |
| AHOLD | I | The address hold request allows another bus master access to the upgrade card's address bus for a cache invalidation cycle. The upgrade card will stop driving its address bus in the clock |

TABLE 2-continued

| Symbol | Type | Name and Function |
|---|---|---|
| | | following AHOLD going active. Only the address bus will be floated during address hold, the remainder of the bus will remain active. AHOLD is active HIGH and is provided with a small internal Pulldown resistor. For proper operation AHOLD must meet setup and hold times. |
| EADS# | I | This signal indicates that a valid external address has been driven onto the upgrade card address pins. This address will be used to perform an internal cache invalidation cycle. EADS# is active LOW and is provided with an internal pullup resistor. EADS# must satisfy setup and hold times for proper operation. |
| CACHE CONTROL | | |
| KEN# | I | The cache enable pin is used to determine whether the current cycle is cacheable. The upgrade card generates a cycle that can be cached and KEN# is active, the cycle will become a cache line fill cycle. Returning KEN# active one clock before ready during the last read in the cache line fill will cause the line to be placed in the on-chip cache. KEN# is active LOW and is provided with a small internal pullup resistor. KEN# must satisfy setup and hold times for proper operation. |
| FLUSH# | I | The cache flush input forces the upgrade card to flush its entire internal cache. FLUSH# is active low and need only be asserted for one clock. FLUSH# is asynchronous but setup and hold times must be met for recognition in any specific clock. FLUSH# being sampled low in the clock before the falling edge of RESET causes the upgrade card to enter the tri-state test mode. |
| PAGE CACHEABILITY | | |
| PWT | O | The page write-through and page cache disable pins reflect the state of the page attribute bits, PWT |
| PCD | O | and PCD, in the page table entry or page directory entry. If paging is disabled or for cycles that are not paged, PWT and PCD reflect the state of the PWT and PCD bits in control register 3. PWT and PCD have the same timing as the cycle definition pins (M/IO#, D/C# and W/R#). PWT and PCD are active HIGH and are not driven during bus hold. PDC is masked by the cache disable bit (CD) in Control Register 0. |
| NUMERIC ERROR REPORTING | | |
| FERR# | O | The floating point error pin is driven active when a floating point error occurs. FERR# is similar to the ERROR# pin on the Intel387 ™ math coprocessor. FERR# is included for compatibility with systems using DOS type floating point error reporting. FERR# will not go active if FP errors are masked in FPU register. FERR# is active LOW, and is not floated during bus hold. |
| IGNNE# | I | When the ignore numeric error pin is asserted the upgrade card will ignore a numeric error and continue executing non-control floating point instructions, but FERR# will still be deasserted by the upgrade card. When IGNNE# is deasserted the upgrade card microprocessor will freeze on a non-control floating point instruction, if a previous floating point instruction caused an error. IGNNE# has no effect when the NE it in control register 0 is set. IGNNE# is active LOW and is provided with a small internal pullup resistor. IGNNE# is asynchronous but setup and hold times must be met to insure recognition on any specific clock. |
| BUS SIZE CONTROL | | |
| BS1 6# | I | The bus size 16 and bus size 8 pins (bus sizing pins) cause the upgrade card to run multiple bus cycles to complete a request from devices that cannot provide or accept 32 bits of data in a single cycle. The bus sizing pins are sampled every clock. The state of these pins in the clock before ready is |

TABLE 2-continued

| Symbol | Type | Name and Function |
|---|---|---|
| | | used by the upgrade card to determine the bus size. These signals are active LOW and are provided with internal pullup resistors. These inputs must satisfy setup and hold times for proper operation. |
| A20M# | I | When the address bit 20 mask pin is asserted, the upgrade card masks physical address bit 20 (A20) before performing a lookup to the internal cache or driving a memory cycle on the bus. A20M# emulates the address wraparound at one Mbyte which occurs on the 8086. A20M# is active LOW and should be asserted only when the processor is in real mode. This pin is asynchronous but should meet setup and hold times for recognition in any specific clock. For proper operation, A20M# should be sampled high at the falling edge of RESET. |
| TEST ACCESS PORT | | |
| TCK | I | Test Clock is an input to the upgrade card and provides the clocking function required by the JTAG boundary scan feature. TCK is used to clock state information and data into and out of the component. State select information and data are clocked into the component on the rising edge of TCK on TMS and TDI, respectively. Data is clocked out of the part on the falling edge of TCK on TDO. |
| TDI | I | Test Data Input is the serial input used to shift JTAG instructions and data into the component. TDE is sampled on the rising edge of TCK, during the SHIF-IR and the SHIFT-DR TAP controller states. During all other tap controller states, TDI is a "don't care". |
| TDO | O | Test Data Output is the serial output used to shift JTAG instructions and data out of the component. TDO is driven on the falling edge of TCK during the SHIFT-IR and SHIFT-DR TAP controller states. At all other times TDO is driven to the high impedance state. |
| TMS | I | Test Mode Select is decoded by the JTAG TAP (Tap Access Port) to select the operation of the test logic. TMS is sampled on the rising edge of TCK. To guarantee deterministic behavior of the TAP controller TMS is provided with an internal pull-up resistor. |
| POWER DOWN MODE (UPGRADE PROCESSOR SUPPORT) | | |
| UP# | | The Upgrade Present pin forces the original processor (601) to 3-state all of its outputs and enter the power down mode when the upgrade card is inserted. When the Upgrade Present pin is sampled asserted by the CPU in the clock before the failing edge of RESET, the power down mode is enabled. UP# has no effect on the power down status except during this edge. The original processor (601) is also forced to 3-state all of it's outputs immediately in response to this signal. The UP# signal must remain asserted in order to keep the pins 3-stated. UP# is active low and is provided with an internal pull-up resistor. |
| HOT | O | HOT asserts when on-board temperature sensor exceeds set limits. |
| L2BRDYO# | I/O | L2 Burst Ready Out is driven by the L2 cache controller and indicates that a read high has occurred and data is being returned to the data bus. |
| L2CBRDY# | I | L2 Cache Burst Ready is generated by the system memory indicating that a burst data transfer is ready to be written into the cache. |
| L2CKEN# | O | L2 Cache Enable indicates that the returning data is cacheable to the upgrade card processor (601A) internal cache. |
| L2CRDY# | I | L2 Cache Ready is generated by the system memory indicating that a non-burst transfer is ready to be written to the cache. |
| L2ENABLE# | I | L2 Cache Ready is generated by the system memory indicating that a non-burst transfer is ready to be written to the cache. |
| L2PRSN# | O | Allows system logic to detect the presence of an |

TABLE 2-continued

| Symbol | Type | Name and Function |
|---|---|---|
| | | optional L2 cache in the upgrade card. |
| L2SKEN# | I | System Cache Enable is an input from the memory indicating that the current cycle is cacheable. |
| L2START# | I/O | Start signals to the memory the beginning of a memory access due to a cache miss or memory write. |
| L2WP | I | Write Protect defines a line as write protected. Any writes to a protected line will not update the cache. |

Thus, the present invention provides a method and apparatus for upgrading (or downgrading) a computer system. The upgrade to the computer system can be done without affecting the bus structure of the computer system and without having to include interface circuitry to accommodate different types of devices. The present invention also provides for upgrading a notebook style computer system using an integrated circuit card.

One benefit of the present invention is that the same IC card can be used to upgrade the memory system of a computer system. The present invention allows a cache memory to be added to the system. If a computer system was originally designed without a second level cache, the present invention allows a second level cache to be added to the computer system without changing any of the existing memory structure. The user need only insert the IC card to gain the added memory.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, an upgradable computer system has been described.

We claim:

1. A computer system comprising:

a first circuit board having a first processor to process information and a memory control system;

an integrated circuit (IC) card having:

(a) an outer frame structure;

(b) a second circuit board;

(c) a second processor to process information, wherein the second processor is coupled to the second circuit board;

(d) a pin interface, coupled to the second circuit board, to transfer signals to and from the second circuit board, wherein the second circuit board the second processor and the memory system are disposed within the outer framing structure;

(e) a plurality of IC card contacts, each located on the surface of the outer framing structure and each coupled to the second circuit board, to supply power to the second circuit board; and (f) a cache memory coupled to the second circuit board that temporarily stores information from the second processor;

(g) a cache memory bus coupling the memory control system of the first circuit board to the cache memory on the second circuit board; and a slot for receiving the IC card, wherein the slot includes a plurality of mating connectors coupled to the first circuit board, wherein the second processor controls the computer system and the first processor is disabled when the plurality of mating connectors are coupled to the pin interface, wherein signals propagate between the IC card and the first circuit board using the pin interface and the plurality of mating connectors, and wherein the signals from the second processor are compatible with the computer system, such that the signals from the second processor are not translated.

2. The computer system defined in claim 1 wherein the second processing means comprises a microprocessor fabricated as a tape carrier package (TCP).

3. The computer system defined in claim 1 wherein the second level cache memory comprises a cache controller fabricated as a thin small outline package (TSOP).

4. The computer system defined in claim 1 wherein the second level cache memory comprises a cache controller fabricated as a TCP package.

5. The computer system defined in claim 1 wherein IC card further includes a thermal sensor coupled to the second circuit board for detecting temperature on the IC card;

stop clock logic coupled to and responsive to the thermal sensor detecting temperature on the IC card above the predetermined temperature, wherein the stop clock logic reduces the frequency of a clock signal to the IC card.

6. The computer system defined in claim 1 wherein the outer framing structure includes at least one key for ensuring proper insertion of the IC card in the slot.

7. The computer system defined in claim 1 wherein each of the IC card contacts comprises a "U" shaped piece of metal.

8. The computer system defined in claim 1 further comprising a plurality of spring loaded contacts, each coupled to the first circuit board and each located so as to connect with a corresponding one of the IC card contacts, to transfer power to the IC card wherein the IC is inserted in the slot.

9. A computer system comprising:

an integrated (IC) card;

a first slot receiving the IC card, wherein the first slot includes a plurality of mating connectors;

a first circuit board having a system bus coupled to the first slot, wherein the plurality of mating connectors are electrically coupled to the first circuit board;

a first processor coupled to said system bus on the first circuit board;

wherein the IC card comprises:

a second circuit board;

a second processor coupled to the second circuit board;

a second level cache memory coupled to the second circuit board and the second processor via the second circuit board;

a plurality of pin receptors coupled to the second circuit board coupled to the plurality of mating connectors when the IC card is inserted in the first slot, wherein signals transferring between the IC card and the first circuit board travel through the plurality of pin receptors and the plurality of mating connectors;

an outer structure enclosing the second processor, cache memory, a second circuit board and the interface, such that only the plurality of pin receptors are exposed for coupling to the plurality of mating connectors;

a main memory for storing information;

a memory control mechanism coupled to the first circuit board, the second processor via the system bus and coupled to the main memory to control access;

a cache memory bus coupling the memory control mechanism of the first circuit board to the second level cache memory via the second circuit board;

wherein the second processor controls the computer system using compatible signals when the IC card is inserted into the first slot and the first processor is disabled, such that the signals from the second processor are not translated, and further wherein signals between the second level cache memory and the memory control mechanism are not translated when interacting with the main memory.

10. The computer system defined in claim 9 wherein the second processor comprises a microprocessor fabricated as a tape carrier package (TCP).

11. The computer system defined in claim 9 wherein the cache memory includes a cache controller fabricated as a thin small outline package (TSOP).

12. The computer system defined in claim 9 wherein the cache memory includes a cache controller fabricated as a TCP package.

13. The computer system defined in claim 9 wherein the outer structure includes at least one key for ensuring proper insertion of the IC card in the slot.

14. The computer system defined in claim 9 wherein the IC card further includes a thermal sensor coupled to the second circuit board for detecting temperature on the IC card; and stop clock logic coupled to and responsive to the thermal sensor detecting temperature on the IC card above a predetermined temperature, wherein the stop clock logic reduces the frequency of a clock signal to the IC card.

15. The computer system defined in claim 9 wherein the IC card further comprises a plurality of IC card contacts, each located on the surface of the outer framing structure and each coupled to the second circuit board, to supply power to the second circuit board.

16. The computer system defined in claim 15 wherein each of the IC card contacts comprises a "U" shaped piece of metal.

17. The computer system defined in claim 15 further comprises a plurality of spring loaded contacts, each coupled to the first circuit board and each located so as to connect with a corresponding one of the IC card contacts, to transfer power to the IC card wherein the IC is inserted in the slot.

* * * * *

UNITED STATES PATENT AND TRADEMARK OFFICE
CERTIFICATE OF CORRECTION

PATENT NO. : 5,586,270
DATED : December 17, 1996
INVENTOR(S) : Rotier et al.

It is certified that error appears in the above-indentified patent and that said Letters Patent is hereby corrected as shown below:

In column 4 at line 36 insert --or-- following "PCMCIA" and prior to "IC"

In column 17 at line 15 of Table 2 delete "failing" and insert --falling--

In column 17 in Table 2 prior to "BREQ" insert --BUS ARBITRATION"

In column 17 at line 69 of Table 2 delete "#All" and insert --will--

In column 21 in Table 2 prior to "A2OM#" insert --ADDRESS MASK--

In column 21 in the symbol "UP#" in line 6 delete "failing"
and insert --falling--

In column 24 at line 32 insert --the-- following "wherein" and prior to "IC".

Signed and Sealed this

Thirteenth Day of May, 1997

Attest:

BRUCE LEHMAN

*Attesting Officer*        *Commissioner of Patents and Trademarks*